(12) United States Patent
Narayanaswamy et al.

(10) Patent No.: US 7,284,011 B1
(45) Date of Patent: Oct. 16, 2007

(54) SYSTEM AND METHODS FOR PROCESSING A MULTIDIMENSIONAL DATABASE

(75) Inventors: Arun Narayanaswamy, Westborough, MA (US); Ronald R. Banci, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 372 days.

(21) Appl. No.: 11/023,773

(22) Filed: Dec. 28, 2004

(51) Int. Cl.
*G06F 17/30* (2006.01)
(52) U.S. Cl. .......................................... 707/102; 707/10
(58) Field of Classification Search .............. 707/1–10, 707/100–104.1, 200–206
See application file for complete search history.

(56) References Cited

U.S. PATENT DOCUMENTS 6,122,636 A * 9/2000 Malloy et al. .............. 707/102
6,161,105 A * 12/2000 Keighan et al. ............ 707/100
2001/0054034 A1 * 12/2001 Arning et al. ................ 707/1
2003/0061132 A1 * 3/2003 Yu et al. ....................... 705/30

* cited by examiner

Primary Examiner—Diane Mizrahi
(74) Attorney, Agent, or Firm—Chapin IP Law, LLC.; Barry W. Chapin, Esq.

(57) ABSTRACT

An agent generates a multidimensional database including file object characteristics, also known as a datacube, on each of a plurality of hosts, and employs a common server for aggregating each of the smaller datacubes into a collective datacube, or multicube, representative of all of the smaller datacubes from each of the hosts. Each individual host, therefore, contributes only a portion of the larger multicube and therefore processes and stores only the multicube portion of the file objects it represents. Each of the smaller datacubes is a potentially inclusive form representative of the entire multicube, however occupies a much smaller space due to the sparsity of storing only a subset of file object entries. Each of the hosts transmits a respective datacube to an aggregation server (aggregator) operable to aggregate, or sum, each of the datacubes from the plurality of hosts into the aggregate multicube.

20 Claims, 9 Drawing Sheets

SYSTEM AND METHODS FOR PROCESSING A MULTIDIMENSIONAL DATABASE

BACKGROUND OF THE INVENTION

Modern information processing environments employ large databases for storing and organizing ever increasing quantities of data. In a conventional information processing environment, multidimensional databases are often employed for storing large sets of data in a normalized (organized, indexed and/or keyed) form. Often, the data stored in a conventional multidimensional database is sparse, meaning that the data points, or values, are scattered and much of the effective data storage area is null, or zero data. Accordingly, typical multidimensional databases are adapted to store vast quantities of data by adapting to sparsity of the data stored thereby and efficiently enumerating the null or zero portions. In this manner, a conventional multidimensional database (DB) may store much more data than a static arrangement which allocates storage for every potential data point, or value, regardless of whether it represents a null value.

In a managed information environment including a storage area network (SAN), for example, there are many file objects, or file entities, stored in multiple storage arrays. Each of the storage arrays is overseen and managed by an agent executing, or running, on a host computer, or host. Accordingly, in a typical SAN, there may be many nodes each executing multiple agents. The agents are responsive to a SAN management application, such as a Simple Network Management Protocol application or other suitable control program, executing on a server node connected to the other nodes in the SAN. Due to the large number of collective file objects (files) in the SAN, a collection of file attributes presented by the aggregate file entries in a large SAN lends itself well to such an OLAP database, or so called "datacube" representation.

SUMMARY

In a typical managed information environment, such as a storage area network (SAN), a large number of stored objects, such as files, are managed for use by a user community. Interconnected host computers run agents operable to store, retrieve, and update the files stored thereby in response to user requests. Accordingly, in a large SAN, the number of file objects (files) may be substantial. Nonetheless, there may be a need to enumerate of each of the file entities may for maintenance, tracking file usage, identifying infrequently used and large files, and other administrative operations. Accordingly, retrieving, managing and analyzing the collective set of file entities presents a formidable task. It would be beneficial, therefore, to provide a data storage and retrieval system for cataloging each of the file entities and organizing the attributes of each of the file entities in a normalized form operable for query analysis, such as file entities fitting a particular size, longevity, or update profile, for example (i.e. files that are excessively large and/or have not been used in some time).

Conventional administrative operations gather such file entity attributes in a time consuming manner which generates a substantial number of line items in a resulting large report file. Other conventional approaches may employ a multidimensional database for storing file entity (object) attribute data. However, since the file entity attribute data is gathered by a plurality of hosts for each of the included storage arrays, large data structures required to represent such a multidimensional database are created and/or transmitted by each of the hosts. Transmission and manipulation of these large data sets containing listings of file characteristics and attributes requires substantial computational and transmission resources.

Accordingly, configurations of the invention substantially overcome the shortcomings presented by conventional file object attribute data and the associated large databases by generating a multidimensional database form, also known as a datacube, on each of a plurality of hosts, and employing a common server for aggregating each of the smaller datacubes into a collective datacube, or multicube, representative of all of the smaller datacubes. Each individual host, therefore, contributes only a portion of the larger multicube and therefore processes and stores only the multicube portion of the file objects it represents. Each of the smaller datacubes is a potentially inclusive form representative of the entire multicube, however occupies a much smaller space due to the sparsity of storing only a subset of file object entries. Each of the hosts transmits a datacube to an aggregation server (aggregator) operable to aggregate, or sum, each of the datacubes from the plurality of hosts into the aggregate multicube. In this manner, each of the hosts manipulates only the portion of the multicube which it contributes, and the aggregation server sums and maintains the inclusive multicube storing the collective set of file object attributes. Further, queries or user requests directed to the multicube include a predetermined set of attributes, in which each attribute corresponds to a predetermined dimension of the datacubes. Attribute values of the file object entries are classified into a predetermined range of buckets for each of the dimensions. The dimensions and buckets are selected according to important file entity attribute (i.e. size, type, creation date) deemed to have substantial queryable value. Accordingly, the server processes queries of the multicube more efficiently because a predetermined set of dimensions and buckets are expected.

In further detail, the system and method for reporting file characteristics in a storage area network includes traversing a plurality of file entities to identify file data characteristics according to predetermined metadata, and gathering multidimensional data sets corresponding to each of the identified file entities, in which each of the multidimensional data sets has a predetermined number of dimensions indicative of an attribute. An aggregator responsive to the SAN management application aggregates the gathered multidimensional data sets to generate an aggregated data cube, or multicube, indicative of collective metrics of each attribute for each of the traversed file entities. Aggregating the multidimensional data sets, or datacubes, further includes subdividing the dimensions into buckets corresponding to each of the attributes, such that each of the buckets is indicative of a subrange of values of the respective attribute.

The aggregated datacubes form a collective multidimensional database, or multicube. An OLAP processor receiving a user request for a query subset of the traversed file entities, and interrogates the aggregated data cubes (multicube) responsive to the user request, in which the user request is indicative of dimensions and attributes. The user request is indicative of all or a subset of the dimensions of the aggregated data cube, and traversing the multicube further includes comparing the dimensions corresponding to the user request and omitting the unspecified dimensions. The interrogating further includes retrieving data values corresponding to the dimensions and attributes to query values in the user request. In this manner, the aggregated multicube effectively replaces the large line item file format of file objects stored in the SAN.

In the exemplary configuration, the multidimensional data sets i.e. (datacubes and multicube) further define a plurality of dimensions and buckets, in which each of the dimensions correspond to attributes and the buckets correspond to predetermined ranges of values for the corresponding attribute. The aggregator is operable to scan, for each of the dimensions, data values corresponding to the attributes of each of the scanned dimensions, and to identify, for each of the scanned data values, a bucket corresponding to the data value. The aggregator stores, in a split word format, values corresponding to the dimension and the bucket, in which the split word format employs a portion of the split word for the dimension value and the remaining portion of the word for the bucket value. The SAN management application then reports, for each of the dimensions and attributes specified in the user request, values corresponding to each of the buckets for each of the requested dimensions to the operator console or other output device.

Prior to generating the multicube from constituent datacubes, a user or operator defines metadata indicative of file attributes to generate, or build, into the multidimensional database. The aggregator identifies each of the file entities contributing to a particular reported output cell value in the output report by enumerating file entities corresponding to a particular bucket.

In particular configurations, interrogating further includes comparing data values corresponding to the dimensions and attributes to values in the user request, and selectively performing predetermined actions according to threshold values of predetermined fields, as so called "intelligent actions" responsive as a trigger to particular conditions indicative of less than optimal performance.

In the exemplary configuration, the datacubes are sparse data objects, such that gathering further includes populating a sparse data object, and transmitting the populated sparse data structures to the server, in which each of the populated sparse data objects corresponds to the same multidimensional data cube. Therefore, the gathering may further include gathering a plurality of sparse datacubes, each of the sparse datacubes indicative of files traversed by a particular agent, and aggregating further includes aggregating the plurality of sparse datacubes into a collective datacube (e.g. multicube), in which the collective datacube has similar dimensions as the plurality of sparse datacubes. Accordingly, the datacubes and multicube represent similar dimensions and buckets, however the datacubes will tend to be more sparse, effectively being summed together in the multicube.

The invention as disclosed above is described as implemented on a computer having a processor, memory, and interface operable for performing the steps and methods as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that, when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Configurations disclosed herein generate a multidimensional database including file object characteristics, also known as a datacube, on each of a plurality of hosts, and employing a common server for aggregating each of the smaller datacubes into a collective datacube, or multicube, representative of all of the smaller datacubes from each of the hosts. Each individual host, therefore, contributes only a portion of the larger multicube and therefore processes and stores only the multicube portion of the file objects it represents. Each of the smaller datacubes is a potentially inclusive form representative of the entire multicube, however occupies a much smaller space due to the sparsity of storing only a subset of file object entries. Each of the hosts transmits a datacube to an aggregation server (aggregator) operable to aggregate, or sum, each of the datacubes from the plurality of hosts into the aggregate multicube. In one example, the multidimensional database may be thought of as a cube of cells, each operable for storage of a particular value.

The cube example, in simplest form, graphically represents a multidimensional database having three dimensions. As is known to those of skill in the art, such multidimensional databases typically have many more dimensions which, however, do not lend themselves well to graphical representation. In this manner, each of the hosts manipulates only the portion of the multicube which it contributes, and the aggregator sums and maintains the inclusive multicube storing the collective set of file object attributes. Further, queries or user requests directed to the multicube include a predetermined set of attributes, in which each attribute corresponds to a predetermined dimension of the datacubes. Attribute values of the file object entries are classified into a predetermined range of buckets for each of the dimensions. The dimensions and buckets are selected according to important file entity attribute (i.e. size, type, creation date) deemed to have substantial queryable value. Accordingly, the server processes queries of the multicube more efficiently because a predetermined set of dimensions and buckets are expected.

Figure 1:
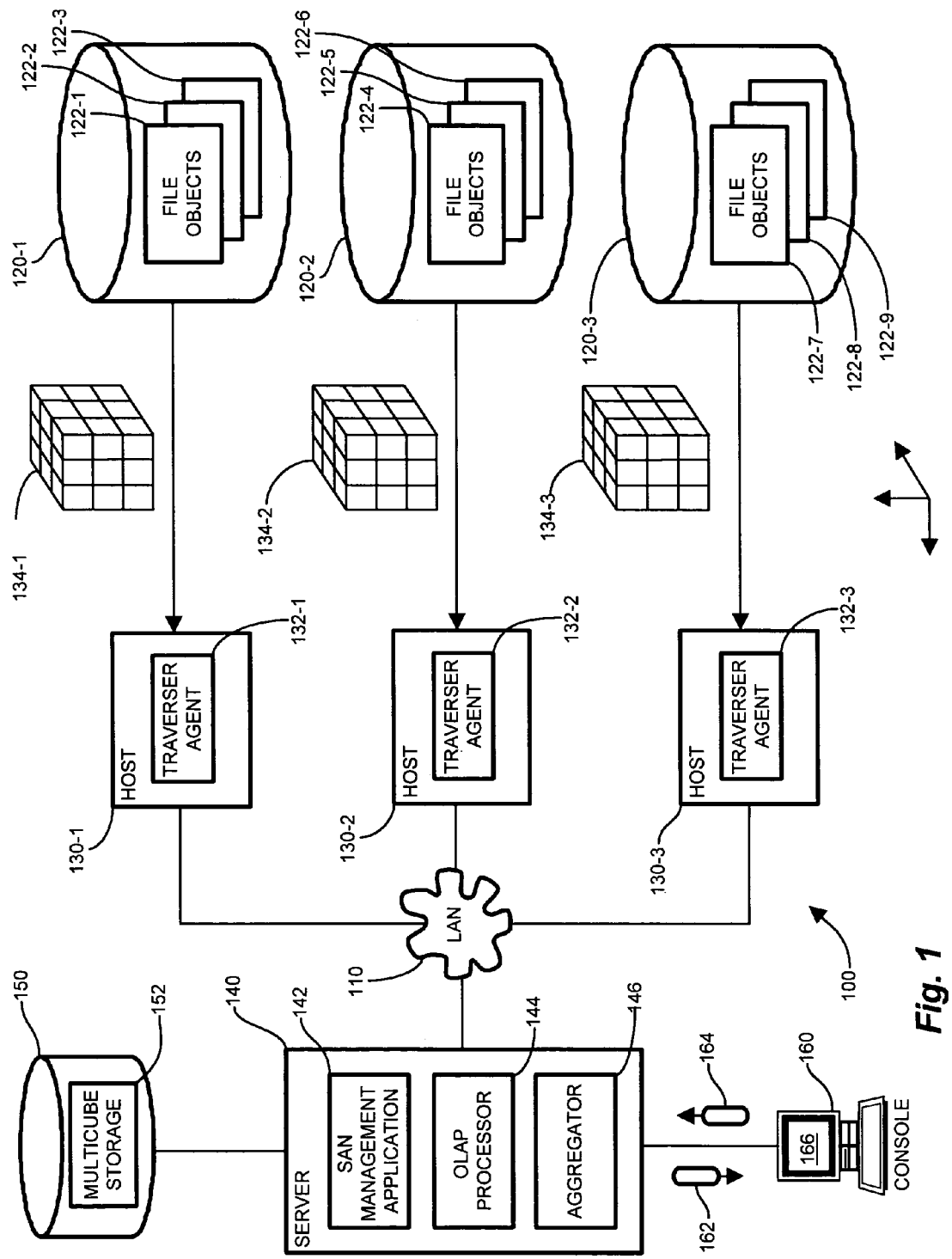
FIG. 1 is a context diagram of an exemplary managed information environment including a storage area network operable for use with configurations discussed herein.

FIG. 1 is a context diagram of an exemplary managed information environment including a storage area network operable for use with configurations discussed herein. Referring to FIG. 1, a managed information environment 100 includes a local area network 110 (LAN) interconnecting a plurality of storage arrays 120-1 . . . 120-3 (120 generally), each including a plurality of file objects 122-1 . . . 122-9 (122 generally), or files, operable for data storage as is known in typical information processing environments. In the exemplary configuration, the LAN 110 is a storage area network (SAN) responsive to a SAN management application 142. Each of the storage arrays 120 connects to one or more hosts 130-1 . . . 130-3 (130 generally) operable to store and retrieve data from the storage array 120. The hosts 130 are further interconnected to a server 140 by the local area network 110, or SAN, which typically interconnects a plurality of other manageable entities, or nodes, including switching devices, databases, and other host 130 and storage array 120 nodes. The server 140 includes the storage area network (SAN) management application 142 operable to manage the storage arrays 120 via the hosts 130. The server further includes an On-Line Analytical Processing (OLAP) processor 144 for processing and manipulating multidimensional databases, and an aggregator 146, for combining data from the multidimensional databases, both responsive to the SAN management application 142. The hosts further include one or more traverser agents 132-1 . . . 132-3 (132 generally) operable to traverse the file objects 122 and gather file attributes. The traversal agent 132 gathers the file attributes, such as size, creation date, modification date and type, to name several, in a multidimensional database form, or datacube 134-1 . . . 134-3 (134 generally) operable for OLAP processing by the OLAP processor 144. The LAN 110 therefore transmits the plurality of datacubes 134 from each of the traversal agents 132 to the SAN management application 142 at the server 140 for further processing by the OLAP processor 144 and the aggregator 146, as will be described further below. The server 140 stores the aggregated multidimensional database, 152, or multicube, resulting from aggregating each of the datacubes 134, in a server repository 150 for producing reports 162 on a display area 166 of a console 160 responsive to a user request 164.

Figure 2:
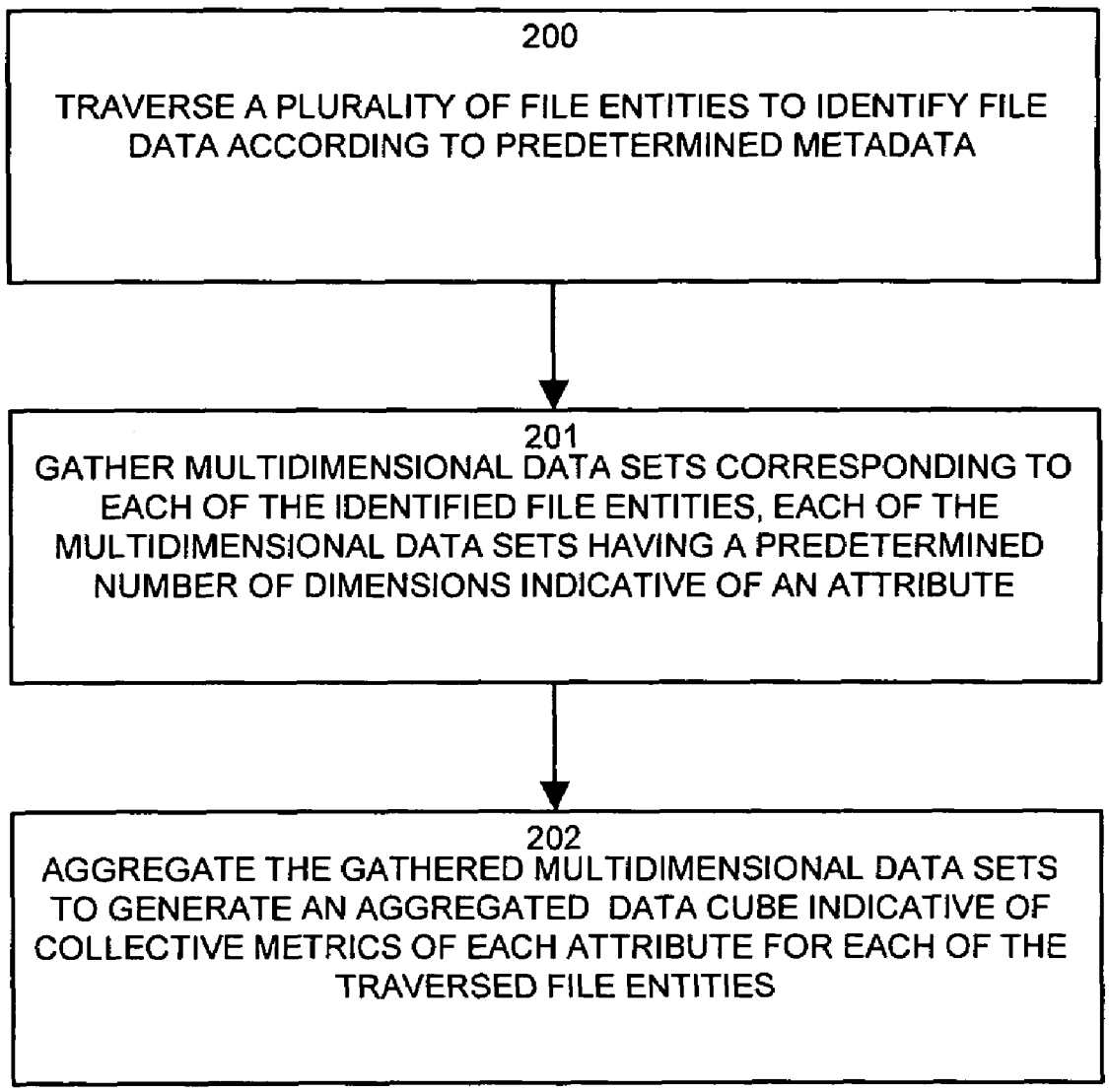
FIG. 2 is a flowchart for gathering the multidimensional databases (datacubes) in the storage area network of FIG. 1 as discussed herein.

FIG. 2 is a flowchart for gathering the multidimensional databases (datacubes) in the storage area network of FIG. 1 as discussed herein. Referring to FIGS. 1 and 2, the system and method for reporting file characteristics in a storage area network includes traversing a plurality of file objects 122 (entities) to identify file data according to predetermined metadata, as depicted at step 100. The traverser agents 132 scan the file objects 122 and/or directories of the respective storage array 120 to read file catalog information such as size, type, and access dates. The traverser agents 132 are responsive to the SAN management application 142, and accordingly, send the identified file data to the server 140. The OLAP processor 144 gathers multidimensional data sets corresponding to each of the identified file entities 122, in which each of the multidimensional data sets 134 has a predetermined number of dimensions indicative of an attribute, as shown at step 201. The OLAP processor 144 allocates a predetermined number of dimensions corresponding to the number of file attributes to be stored in the multidimensional database 152. Therefore, the OLAP processor 144 expects a set of file attributes for each of the dimensions. The aggregator 146, responsive to the OLAP processor 144, aggregates the gathered multidimensional data sets 134 to generate an aggregated data cube 152 indicative of collective metrics of each attribute for each of the traversed file entities 122, as depicted at step 202. The aggregator 146 traverses each of the datacubes 134 and aggregates, or sums, the file metrics stored thereby, such as file size, modification dates, type, and other attributes. The resulting multicube 152, therefore, stores the collective attributes of each of the files 122 from each of the storage arrays 120. As indicated above, each of the datacubes 134 representing a particular storage array 120 is a sparse database having similar dimensions as the aggregated multicube 152. Each of the datacubes 134, therefore, is operable to store the entire set of aggregated file metrics as the resulting aggregated multicube 152. However, the sparse datacubes 134 need not allocate storage for the null, or zero, entries of the sparse datacube 134.

Figure 3:
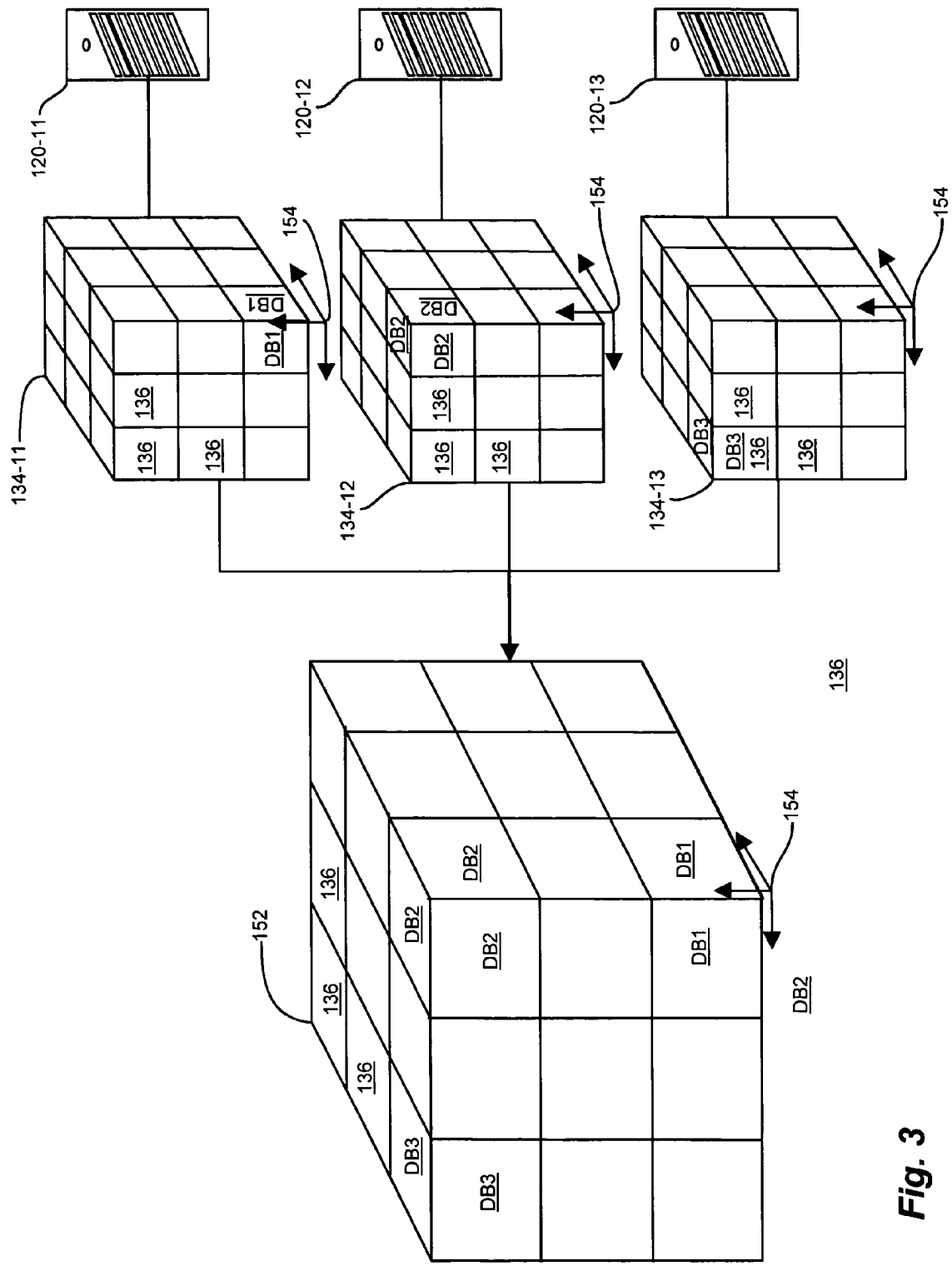
FIG. 3 is a block diagram of aggregating a plurality of host (datacube) multidimensional databases into an aggregated multicube in the storage area network of FIG. 1.
Figure 4:
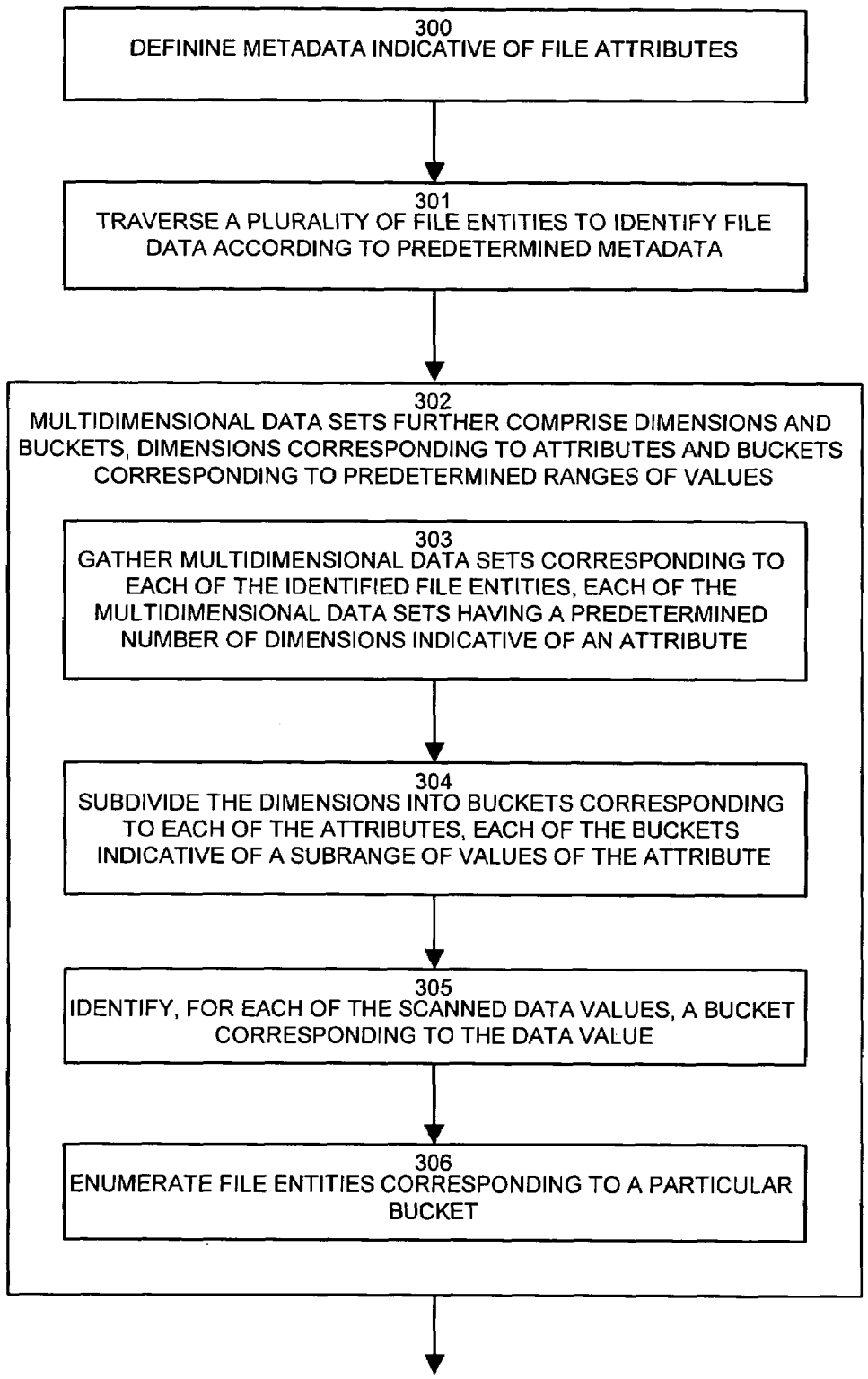
FIGS. 4-7 are a flowchart depicting multidimensional database aggregation using the datacube/multicube arrangement of FIG. 3.
Figure 5:
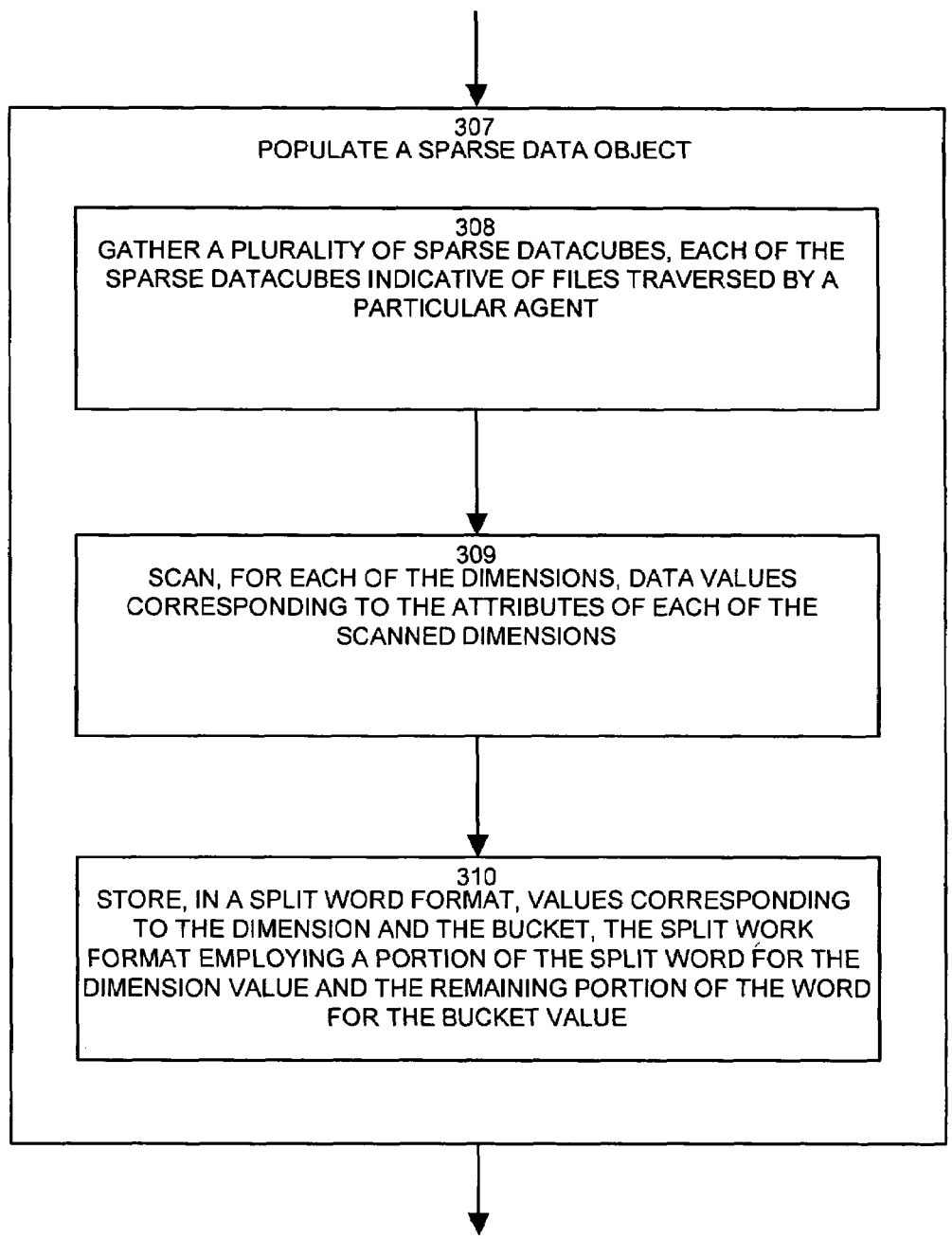
Figure 6:
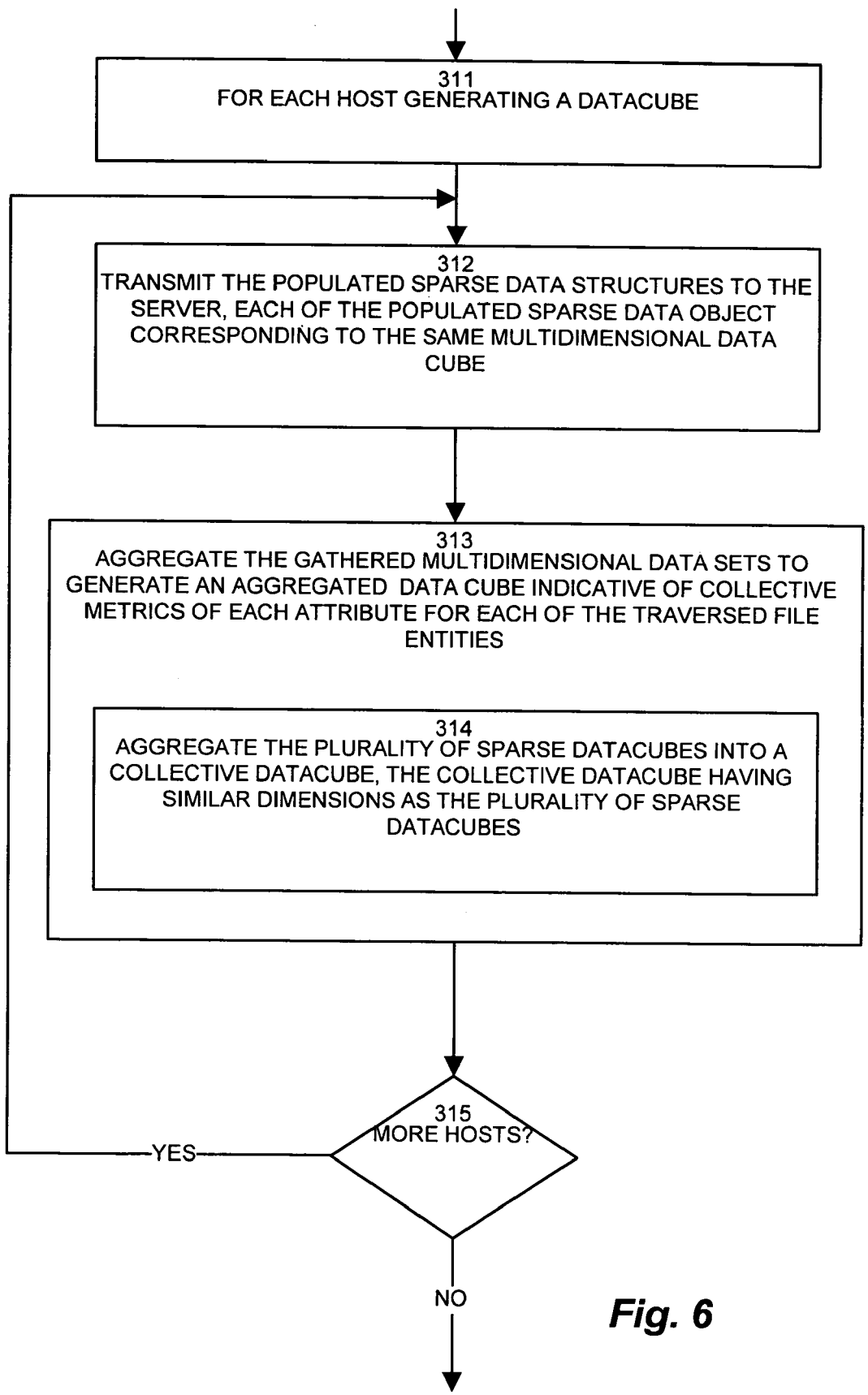

FIG. 3 is a block diagram of aggregating a plurality of host (datacube) multidimensional databases into an aggregated multicube 152 in the storage area network environment 100 of FIG. 1. Referring to FIGS. 1 and 3, the traverser agent 130 traverses plurality of storage arrays 120-11 . . . 120-13 to gather datacubes 134-11 . . . 134-13, respectively. In the exemplary configuration shown, the storage arrays 130 may be Symmetrix storage array devices, marketed commercially by EMC Corporation, of Hopkinton Mass. Alternatively, any suitable file object storage or mass storage device may be employed (e.g. disk drive, disk array, disk farm, etc.). As indicated above, each of the datacubes 134 is further subdivided into portions 136 for illustrative purposes (note that the portions are depicted as subcubes within the datacubes, not necessarily individually labeled for readability). Each of the storage arrays 120 contributes to a particular portion 136 of the multidimensional database 134. For example, storage array 120-11 contributes to, or populates, data in portion DB1. Storage array 120-12 populates portion DB2, and storage array 120-13 populates portion DB3. The resulting aggregated multicube 152 includes portions DB1, DB2 and DB3 as part of the same multidimensional database 152, having similar dimensions as the constituent datacubes 134-11 . . . 134-13. In this manner, each host 130 need only process and store the portion of the datacube 136 which it populates. The remaining null or zero portions need not be directly stored or processed at the hosts 130. Rather, the aggregator 146 builds the multicube 152 corresponding to the datacube portions 136 contributed by each of the storage arrays 120.

It should be noted that the datacube 134 and multicube 152 representation shown here is exemplary, and depicts three dimensions 154 in a graphical cube format for illustrative purposes. In accordance with the configurations herein, additional dimensions 154 may be employed according to OLAP processing techniques which may not lend themselves well to graphical depiction on a paper medium. Further, the database portions DB1, DB2 and DB3 are shown as encompassing only a single subcube portion 136 within the larger datacube 134. Such portions 136 contributed by a particular storage array may be depicted in multiple subcube portions 136, as the data may logically fall within other areas of the multidimensional database 134 depicted by the subcubes. The individual datacubes 134 generated by the traverser agents 132 on each of the hosts 130 need retrieve and store only a subset portion 136 of the data potentially attributable to the entire datacube 134, and hence to the multicube 152. The individual hosts 130 do not employ memory or processing resources for data (i.e. portions 136 of the datacube 134) not corresponding to the storage array connected to the particular hosts. In other words, each host manages and traverses data corresponding only to the portion 136 attributable, or populated on behalf of, the storage array 120 for which it is responsible. The remaining portions 136 corresponding to other storage arrays 120 are not combined (aggregated) until the data is transmitted to the aggregator 146 at the server.

FIGS. 4-7 are a flowchart depicting multidimensional database aggregation using the datacube/multicube arrangement of FIG. 3. Referring to FIGS. 1 and 3-7, an operator or user (not specifically shown) defines metadata indicative of file attributes for gathering, storing and reporting via the datacubes 134, as depicted at step 300. The file attributes are typically those which convey important or performance relevant metrics about the files 122, such as size and type, but may contain any suitable file attributes as specified by the user. The user may employ a graphical user interface, discussed further below, for such file attribute specification.

Employing the defined metadata, each of the traverser agents 132 traverses the plurality of file entities, or file objects 122 in the storage arrays 120, to identify file data according to the predetermined metadata, as depicted at step 301. The traverser agents 132 typically operate as crawlers during low usage periods such as overnight, to periodically gather a snapshot of the file objects 122 (files), however may operate according to an alternate schedule as demands require and performance allows. As indicated above, the traverser agents 132 generate the multidimensional data sets, expressed as datacubes 134, which further include dimensions and buckets, in which the dimensions correspond to attributes and the buckets correspond to predetermined ranges of values, as described at step 302 (note that the three dimensions 154 illustrated for the datacubes are exemplary; alternate numbers of dimensions are employable in the multidimensional database 134). For example, a particular dimension may represent file size, and the corresponding buckets may include less than 100K, 100K . . . 1 MB, and >1 MB in size. Dimensions and buckets and applicable values thereto are discussed further below with respect to the graphical user interface in FIGS. 8 and 9.

Accordingly, the traverser agents 132 gathers the multidimensional data sets 134 corresponding to each of the identified file entities 122, in which each of the multidimensional data sets has a predetermined number of dimensions 154 indicative of an attribute, as depicted at step 303. The traverser agent 132, therefore, reads the values corresponding to the attributes, such as file size, subdivides the dimensions into buckets corresponding to each of the attributes, in which each of the buckets is indicative of a subrange of values of the file object 122 attribute, as disclosed at step 304. The traverser agent 132 compares the attribute values of the traversed dimensions 134, and identifies, for each of the scanned data values, the bucket corresponding to the data value, as depicted at step 305. The resulting identified data values, therefore, enumerate the file entities 122 corresponding to a particular bucket, such as the number of files having a size within a particular range, as shown at step 306.

The traverser agents 132, executing on each of the hosts 130, populates a sparse data object, such as the datacube 134, with the identified data values, as shown at step 307. As indicated above, multidimensional databases are characterized in that conventional static allocation techniques which allocate memory regardless of data value occupancy would rapidly deplete memory resources if employed. As multidimensional databases are often sparse, meaning that many effective, or virtual, locations are null, representation techniques which allocate only non-null data values are used. Accordingly, the collective set of traverser agents 132 gathers a plurality of sparse datacubes 134-N, in which each of the sparse datacubes is indicative of files 122 traversed by the particular agent 132, as shown at step 308. Therefore, to populate the respective datacube 134, each traverser agent 132 scans, for each of the dimensions, data values corresponding to the attributes represented by each of the respective dimensions 154, as disclosed at step 309. In the exemplary configuration, the traverser agent 132 stores, in a split word format, values corresponding to the dimension and the bucket, in which the split word format employs a portion of the split word for the dimension value and the remaining portion of the word for the bucket value, as depicted at step 310. Such a split word format provides efficient sparse database storage by employing the known, or predetermined attributes and buckets to represent the data values, because each value gathered with respect to a file object 122 falls into one of the buckets for the dimension 154 representing that attribute.

As indicated above, the exemplary configuration discussed herein employs a split word arrangement to store the data values 180 in an efficient manner. The split word storage structure will now be discussed in further detail. Conventional computers employ microprocessors having a word size. The word size specifies the number of bits which the computer processes at a single time, or for a single instruction. Word sizes are typically even powers of 2; most modern computers have a 32 or 64 bit word size, as is known to those of skill in the art. Word size is significant because it is efficient for the processor to fetch and process information in increments equal to the word size. While modern evolutions in storage technology, memory conservation and efficiency has fallen somewhat out of vogue and memory is not as guarded a resource as it has traditionally been. However, in a multidimensional database, where processing and storage demands tend to increase exponentially, memory conservation and particularly attention to word size can have a substantial impact upon resources (i.e. memory and instruction cycles) required to process data in such a multidimensional database.

Following building of the individual datacubes 134 by each of the traverser agents 132, the OLAP processor 144 generates the combined, or master, multicube 152 representing all contributing datacubes 134. As depicted at step 311, for each host 130 generating a datacube 134, the respective traverser agent 132 transmits the populated sparse data structure, or datacube 134, to the server 140, in which each of the populated sparse data objects correspond to the same multidimensional datacube 134 structure, as disclosed at step 312. In other words, each of the datacubes 134 includes similar dimensions and buckets, so while not having identical data values or sparsity, are operable to be combined according to the same attribute metrics, i.e. number of files of a particular size, or age, etc.

The aggregator 146 aggregates the gathered multidimensional data sets 134 to generate an aggregated data cube 152 indicative of collective metrics of each attribute for each of the traversed file entities 122, as shown at step 313. Therefore, the aggregator 146 aggregates the plurality of sparse datacubes 134 into a collective datacube (e.g. multicube 152), in which the collective datacube 152 has similar dimensions as the plurality of sparse datacubes 134, to allow aggregation, or summing, of similar attributes, as depicted at step 314. The aggregator 146 performs a check, depicted at step 315, to determine if there are more datacubes 134 from hosts 130 to aggregate. If so, control reverts to step 312 to aggregate all contributing datacubes 134. In this manner, the aggregator 146 builds the aggregate multidimensional database, or multicube 152, storing the accumulated file attributes for each of the file objects 122, via the individual datacubes 134 from each of the hosts 130.

The OLAP processor 144 invokes the aggregator 146 on a periodic basis, such as nightly, to maintain the aggregated database (multicube) 152 in a current state pending user requests. Accordingly, at a subsequent time, the SAN management application 142 receiving a user request for a query subset of the traversed file entities 122, as depicted at step 316. The console 160 receives and transmits the user request 164 to the server 140. Such a user request 164 is indicative of all or a subset of the dimensions 154 of the aggregated data cube 152, and generating the response 162 includes comparing the data values of the dimensions 154 corresponding to the user request and omitting the unspecified dimensions 154, as shown at step 317. As indicated above, each of the datacubes 134 and the multicube 152 represents a predetermined attribute set as a respective dimension. A user request 164 may request a report based on all or less than all of the available dimensions 154.

In response to the user request 164, the OLAP processor 144 interrogates the aggregated data cube 152 responsively to the user request 164, in which the user request is indicative of dimensions and attributes, in which the interrogating includes retrieving data values corresponding to the dimensions and attributes to query values in the user request, as shown at step 318. Accordingly, the OLAP processor 144 compares the data values corresponding to the dimensions and attributes to query values in the user request 164, as depicted at step 319. The OLAP processor 144 reports, for each of the dimensions and attributes specified in the user request 164, the values corresponding to each of the buckets for each of the requested dimensions, as disclosed at step 320. Therefore, the OLAP processor 144 retrieves the multicube 152 values for the requested attributes by reporting the stored values of each of the buckets for the attributes. As will be discussed further below, the queries typically include more than one attribute, such as "files greater than 1 MB and a creation date less than 1 week ago," requiring retrieval of dimensions corresponding to the size attribute and the creation date attribute. The OLAP processor 144 reports the response 162 to the user console 160 or other suitable output device, such as to a file, email, or network connection.

The SAN management application 142 may include certain threshold trigger values pertaining to the multidimensional database 152 attribute values. For example, a user may desire to purge file entries of a particular age and size. Accordingly, a user may attach an action to the relevant threshold trigger values. The SAN management application 142 identifies each of the file entities 122 contributing to a particular reported output cell value of the report 162, as shown at step 321. Therefore, the OLAP processor 144 tracks a particular bucket entry, or value, back to the file objects from which it emanates. The SAN management application 142 then selectively performs predetermined actions according to threshold values of predetermined fields, known as intelligent actions, responsive to the specified threshold trigger values, as depicted at step 322. In this manner, the OLAP processor 144 reports, for example, the file objects 122 of the particular age and size to enable the SAN management application 142 to delete such entries.

Figure 7:
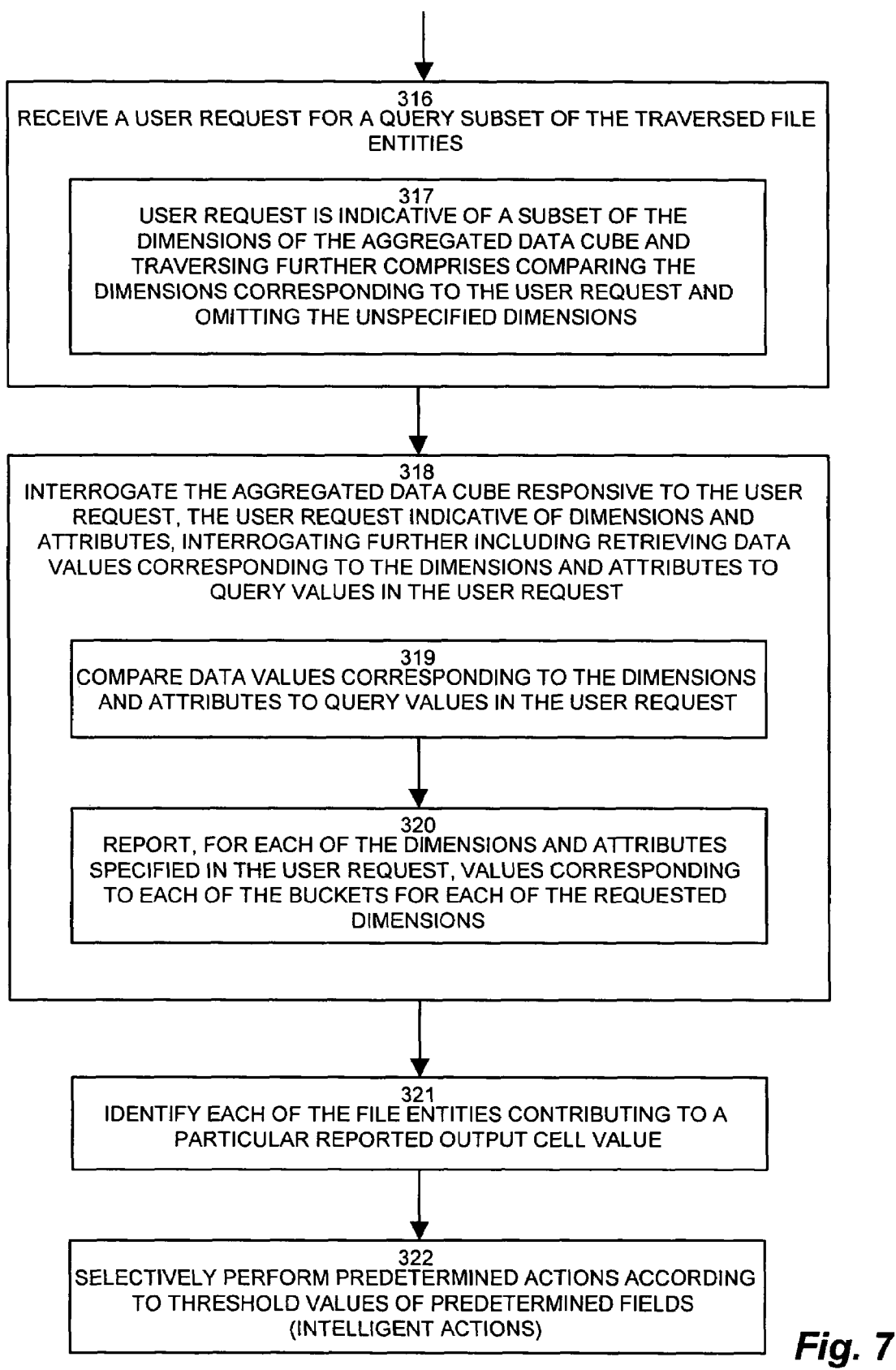
Figure 8:
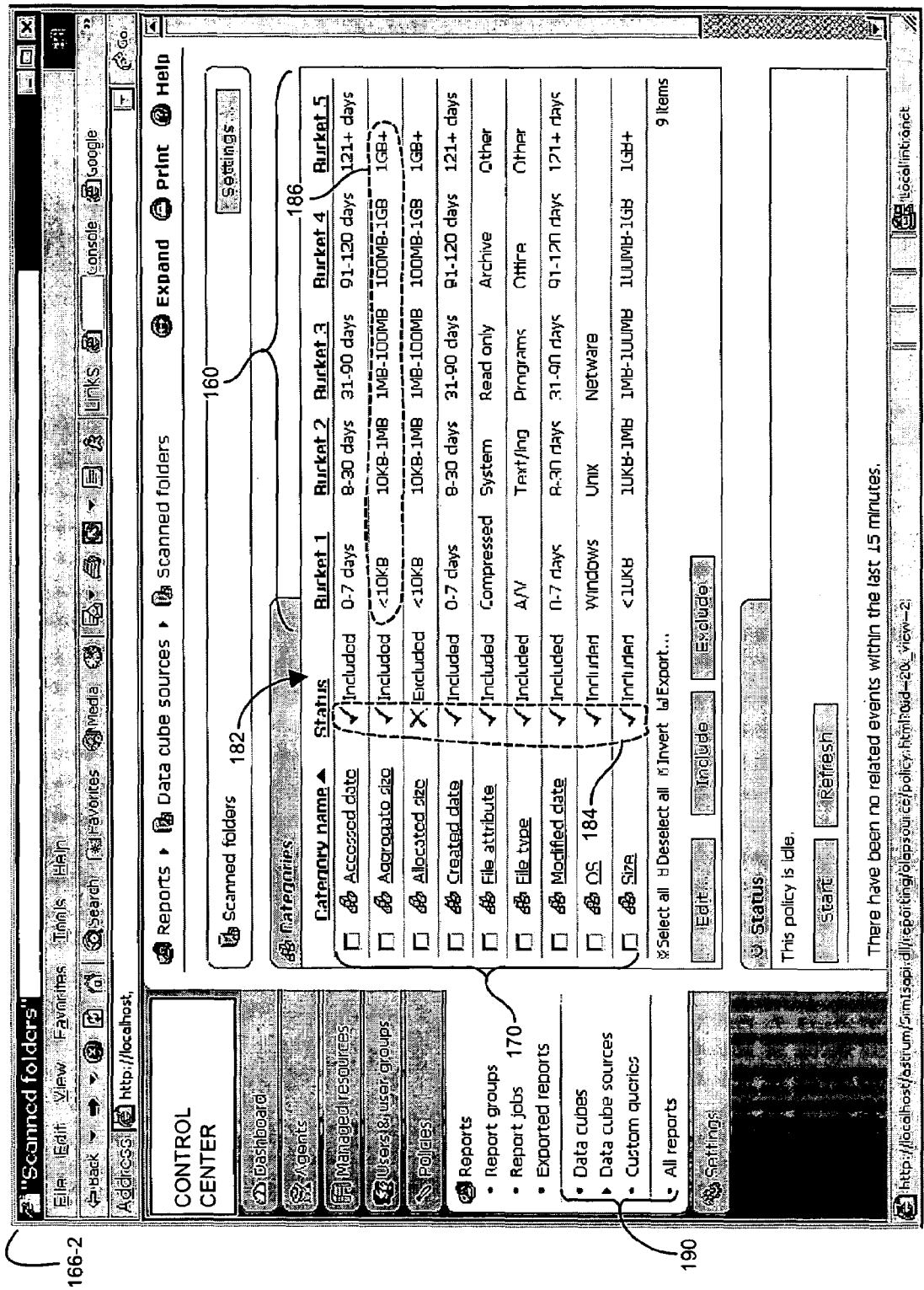
FIG. 8 is an exemplary graphical user interface screen depicting buckets corresponding to attribute values and categories corresponding to dimensions in a multidimensional datacube.
Figure 9:
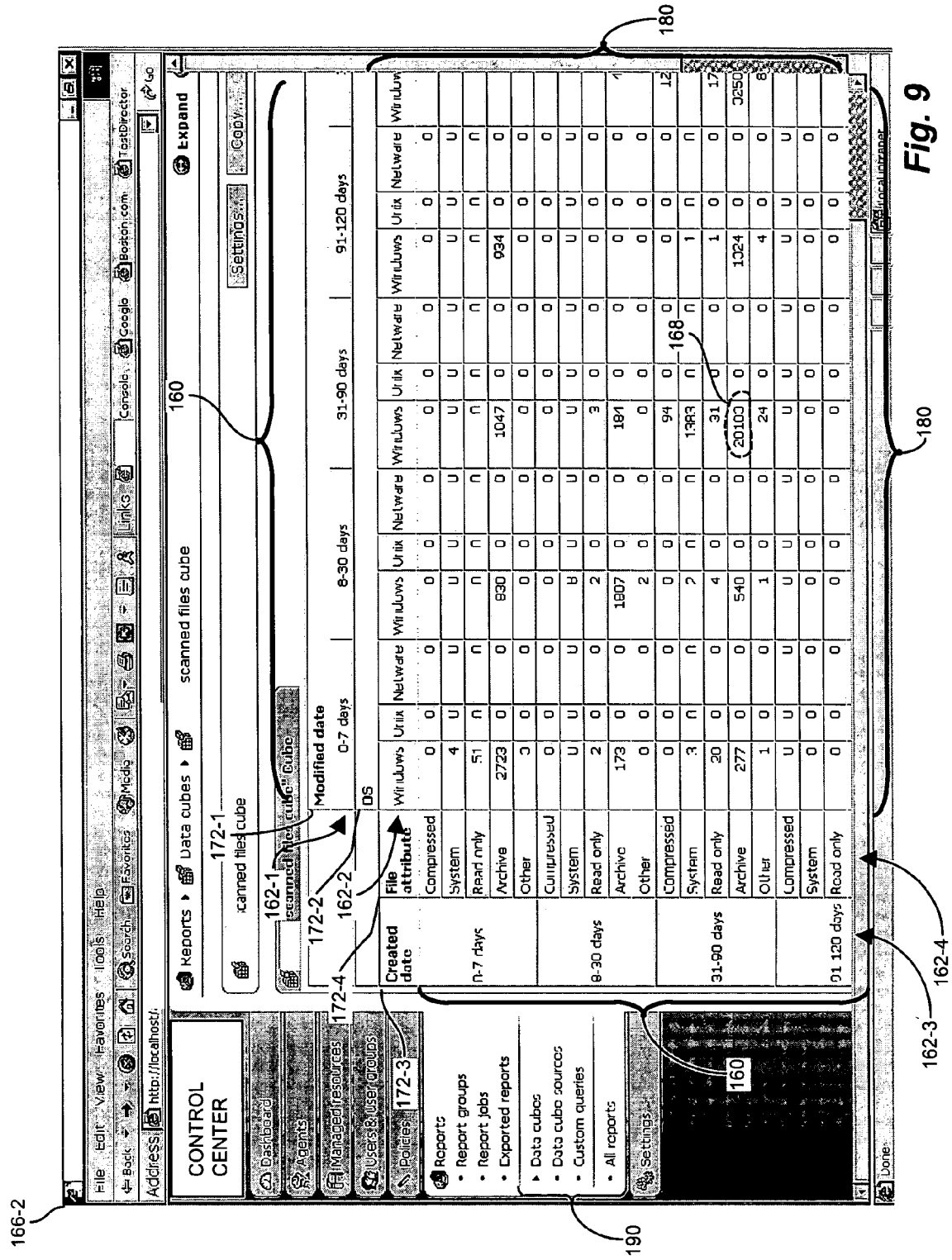
FIG. 9 is an exemplary GUI reporting file attributes from the aggregated multicube in response to a user request.

FIG. 8 is an exemplary graphical user interface screen depicting buckets corresponding to attribute values and categories corresponding to dimensions in a multidimensional datacube. Referring to FIGS. 1, 3 and 7, a display screen 166-1 is operable for display on the display area 166 of the console 160. The display screen 166-1 shows buckets 160 and attributes 170, or categories. The attributes 170 each correspond to a dimension 154 of the datacube (multidimensional database) 134, 152, and the buckets 160 correspond to values of the attributes 170. Each data value read for a dimension falls into one of the buckets 160 corresponding to that dimension 154 (i.e. attribute 170). In the exemplary screen 166-1, a user specifies sources for the datacubes 134 from among the available attributes 170, as indicated by selections window 190. A status column 182 lists available attributes 170 from which to build, or gather, attribute 170 values for the datacubes 134, and checkoff boxes 184 allow selection of the particular attributes for inclusion in the datacube 134. Note that the status column 182 indicates inclusion in the datacube (i.e. a source), rather than the attributes 170 requested in a user request 164, which may be the same or a subset of attributes 170.

The bucket 160 selections are also user selectable according to the range of expected data values 180 for the attribute in question. As indicated above, the number of dimensions 154 and buckets 160 therein is proportional to the performance. In the exemplary configuration, for example, eight attributes with five buckets each has proven useful. Alternate combinations of attributes and buckets, however, may be employed in alternate configurations, as shown by the exemplary bucket 160 values for file size 186.

FIG. 8 is an exemplary GUI reporting file attributes from the aggregated multicube in response to a user request. An output report 166-2 is displayable on the console 160 display area 166, and shows the bucket 160 values for each of the buckets 160 of selected attributes 170, in response to a user request 164. In the exemplary report 166-2, four attributes 170 have been selected, including modified date 172-1, operating system (OS) 172-2, created date 172-3, and file attribute 172-4 (note that "file attribute" indicates a qualification of an individual file as compressed, read only, archive, etc. and differs from the "attribute" 170 corresponding to a datacube dimension 154).

Each of the selected attributes 172-1 . . . 172-4 specifies bucket ranges 162-1 . . . 162-4, respectively. The report body values 180 include the data values attributable to each of the buckets 160 for each of the dimensions 170. Since the display 166-2 is a chart form, multiple dimensions 172-1 . . . 172-4 are nested along each axis, and the bucket ranges 162-1 . . . 162-4 embedded within a single bucket range of another attribute 172. For example, each of the modified date 172-1 buckets 1620-1 each includes a full bucket range for OS 172-2, replicating the OS data values of "Windows," "Unix" and "Netware." Additional levels of nesting are applied to accommodate the attributes 170 selected for a report 166-2.

The resultant report 166-2 enables a user or operator to identify and conclude file objects 122 which may be hindering performance, inefficiently consuming space, or exhibiting other detrimental characteristics. Further, the multidimensional database gathering and aggregation mechanism is not limited to file objects, but rather is applicable to multidimensional databases operable with alternate data sources as well. In the exemplary configuration, an analysis of the report body might be as follows. Data value 168, specifying 168 file objects, identifies Windows files having a created date of 31-90 days and a modified date of 31-90 days and having a file attribute value of "Archive." A user or operator analyzing such a report may conclude an excessive quantity of files 122 and perform purging accordingly. Alternatively, an intelligent action may be established for setting an appropriate threshold and triggering appropriate remedial actions in the future.

Aggregate multicube 152 data values from all data sources (i.e. the individual host generated datacubes 134) may, in particular configurations, be stored in the multicube storage 152 in a data structure such as a table. This table 152 includes a field for the data source policy ID, 8 fields for up to 8 dimension codes, and a value field to specify the number of matching source rows are in the bucket described by these dimension codes. A "dimension code" describes both the category type ID and the bucket ID using a single integer variable; the upper 24 bits indicate the category type ID and the lower 8 bits indicate the bucket number. In the multicube storage table 152, dimension codes appear in ascending category type ID order in order to eliminate duplicate rows due to permutations of the same data. For example, in hexadecimal notation, a dimension that represents bucket 4 of the last accessed date category (0x40) is 0x4+0x40=0x44. Bucket numbers are zero-indexed.

Efficient DB management configures the dimensions and attributes of the datacubes 134, 152 employing the split word format. Configurations discussed herein employ a multidimensional database 134, 152 having a predetermined set of dimensions, in which each dimension corresponds to a file object attribute 170. Further, each attribute 170 is classified according to a predetermined set of buckets 160. As indicated previously, the exemplary configuration stores the dimension and the bucket in the split word format. The split word format splits a processor word (typically 32 or 64 bits, depending on the computer) to use a certain number of bits to identify the dimension and another portion of the bits to denote the bucket identity. The data value 180 associated with the dimension/bucket pair may or may not also be stored in the split word. In one exemplary configuration, eight (8) dimensions are employed, using 3 bits (2^3=8) to identify the dimension. In this manner, the split word format allows aggregation of a plurality of datacubes 134, or multidimensional databases computed from a plurality of agents, into an aggregate multidimensional data set, or multicube 152, which represents the aggregation of each of the multidimensional data sets from the agents 132.

The aggregation of the corresponding buckets 160 from each of the datacubes 134 involves summing each of the data values 180 according to the dimensions and buckets 170, 160 respectively. Configurations herein employ a particular class via a generic interface to generate the multicube 152 table with aggregate counts of the number of data source records fitting into each bucket for each possible category combination. The generator works in two phases:

1. In a first phase, the data source records are read once. For each record, a recursive technique increments the appropriate bucket 160 counts for all category combinations.

2. In a second phase, the bucket 160 counts are written to a file and then bulk-copied into the database. The file writing process also uses a recursive mechanism.

The in-memory data structure used by both phases takes the form of a tree of linear arrays. Each set of cells represents a specific category; in the exemplary configuration there are five cells per category to represent each of the buckets within these categories. Each cell holds a count for the number of source rows matching the given bucket, and corresponds to a pointer to arrays of additional array structures.

A top-level array structure holds the first dimension of data. This represents counts as if only one category were viewed at a time in the data cube. The top-level cells have pointers to second-level array structures to represent counts as if only two categories were viewed at a time in the data cube. Because allocation is lazy, only those arrays necessary for describing non-zero counts are allocated, thus providing the sparse allocation employing storage only for non-null attribute values.

TABLE I

| # Categories | Minimum $b^c$ | Current implementation $(b + 1)^c - 1$ |
|---|---|---|
| 5 | 3,125 | 7,775 |
| 6 | 15,625 | 46,655 |
| 7 | 78,125 | 279,935 |
| 8 | 390,625 | 1,679,615 |
| 9 | 1,953,125 | 10,077,695 |

Allocation of the multicube 152, in the exemplary configuration, occurs as follows. Assuming perfectly distributed data, the absolute minimum number of rows required for aggregate data is $b*c$, where b is the number of buckets and c is the number of categories. The current implementation stores additional aggregate values 180 so that a GROUP BY clause, as is known in the art, will not be needed when querying data (i.e. all possible configurations of dimensions from 1 to c are stored in the table). The result may impose a small amount of additional overhead but makes the implementation less complex and its queries faster. In effect, b increases by 1 for an additional null bucket. The number of rows needed for the implementation is thus $(b+1)c-1$, assuming perfectly distributed data. In most cases data is not nearly as fully distributed and/or all buckets within a category are not utilized, so for practical purposes the number of rows required is much fewer than this expression predicts. Therefore, assuming that each category provides a maximum of 5 buckets, and data is perfectly distributed, the total number of rows required for the aggregate data in the multicube table 152 is as shown in table 1.

The SAN simulation framework and mechanism disclosed herein may encompass a variety of alternate deployment environments. In a particular configuration, as indicated above, the exemplary SAN management application discussed may be the EMC Control Center (ECC) application, marketed commercially by EMC corporation of Hopkinton, Mass., assignee of the present application.

Those skilled in the art should readily appreciate that the programs and methods for reporting file characteristics in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer. The operations and methods may be implemented in a software executable object including a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for reporting file characteristics in a storage area network has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for reporting file characteristics in a storage area network comprising:
    traversing a plurality of file entities to identify file data concerning attributes of the file entities according to predetermined metadata;
    gathering multidimensional data sets corresponding to each of the identified file entities, each of the multidimensional data sets having a predetermined number of dimensions indicative of an attribute; and
    aggregating the gathered multidimensional data sets to build an aggregated data cube indicative of collective metrics of each attribute for each of the traversed file entities, aggregating further comprising:
    scanning, for each of the dimensions, data values corresponding to the attributes of each of the scanned dimensions;
    identifying, for each of the scanned data values, a bucket corresponding to the data value; and
    storing, in a split word format, values corresponding to the dimension and the bucket, the split word format employing a portion of the split word for the dimension value and the remaining portion of the word for the bucket value.

2. The method of claim 1 wherein gathering further comprises subdividing the dimensions into buckets corresponding to each of the attributes, each of the buckets indicative of a subrange of values of the attribute.

3. The method of claim 2 further comprising
    receiving a user request for a query subset of the traversed file entities; and
    interrogating the aggregated data cube responsive to the user request, the user request indicative of dimensions and attributes, interrogating further including retrieving data values corresponding to the dimensions and attributes to query values in the user request.

4. The method of claim 3 wherein the user request is indicative of a subset of the dimensions of the aggregated data cube and traversing further comprises comparing the dimensions corresponding to the user request and omitting the unspecified dimensions.

5. The method of claim 1 wherein multidimensional data sets further comprise dimensions and buckets, dimensions corresponding to attributes and buckets corresponding to predetermined ranges of values.

6. The method of claim 5 further comprising reporting, for each of the dimensions and attributes specified in the user request, values corresponding to each of the buckets for each of the requested dimensions.

7. The method of claim 6 further comprising:
    defining metadata indicative of file attributes of the file entities;
    identifying each of the file entities contributing to a particular reported output cell value; and
    enumerating the file entities corresponding to a particular bucket.

8. The method of claim 7 wherein interrogating further comprises:
    comparing data values corresponding to the dimensions and attributes to query values in the user request; and
    selectively performing predetermined actions according to threshold values of predetermined fields.

9. The method of claim 1 wherein gathering further comprises:
    populating a sparse data object; and
    transmitting the populated sparse data structures to the server, each of the populated sparse data objects corresponding to the multidimensional data set.

10. The method of claim 9 wherein:
    gathering further comprises gathering a plurality of sparse datacubes, each of the sparse datacubes indicative of files traversed by a particular agent; and
    aggregating further comprises aggregating the plurality of sparse datacubes into a collective datacube, the collective datacube having similar dimensions as the plurality of sparse datacubes.

11. A storage area network (SAN) management server for reporting file characteristics in a storage area network comprising:
    a SAN management application deploying a plurality of traverser agents to traverse a plurality of file entities to identify file data according to predetermined metadata, the SAN management application further configured to:
    scan, for each of the dimensions, data values corresponding to the attributes of each of the scanned dimensions;
    identify, for each of the scanned data values, a bucket corresponding to the data value; and
    store, in a split word format, values corresponding to the dimension and the bucket, the split word format employing a portion of the split word for the dimension value and the remaining portion of the word for the bucket value;
    an online analytical processor (OLAP) responsive to the SAN management application and operable to gather multidimensional data sets corresponding to each of the identified file entities, each of the multidimensional data sets having a predetermined number of dimensions indicative of an attribute;
    an aggregator responsive to the SAN management application and operable to aggregate the gathered multidimensional data sets to build an aggregated data cube indicative of collective metrics of each attribute for each of the traversed file entities; and
    metadata indicative of file attributes, the traverser agents further configured to: identify each of the file entities contributing to a particular reported output cell value; and enumerate file entities corresponding to a particular bucket.

12. The server of claim 11 wherein the aggregator is configured to subdivide the dimensions into buckets corresponding to each of the attributes, each of the buckets indicative of a subrange of values of the attribute.

13. The server of claim 12 wherein the OLAP processor is further configured to:
    receive a user request for a query subset of the traversed file entities; and interrogate the aggregated data cube responsive to the user request, the user request indicative of dimensions and attributes, interrogating further including retrieving data values corresponding to the dimensions and attributes to query values in the user request.

14. The server of claim 13 wherein the user request is indicative of a subset of the dimensions of the aggregated data cube and traversing further comprises comparing the dimensions corresponding to the user request and omitting the unspecified dimensions.

15. The server of claim 14 further comprising metadata indicative of file attributes, the traverser agents further configured to:
   identify each of the file entities contributing to a particular reported output cell value; and
   enumerate file entities corresponding to a particular bucket.

16. The server of claim 15 wherein interrogating further comprises:
   comparing data values corresponding to the dimensions and attributes to query values in the user request; and
   selectively performing predetermined actions according to threshold values of predetermined fields, the predetermined fields thus triggering intelligent actions.

17. The server of claim 11 wherein the traverser agents are further configured to:
   populate a sparse data object; and
   transmit the populated sparse data objects to the server, each of the populated sparse data objects corresponding to the same multidimensional data set.

18. The server of claim 17 wherein the aggregator:
   gathers a plurality of sparse datacubes, each of the sparse datacubes indicative of files traversed by a particular agent; and
   aggregates the plurality of sparse datecubes into a collective datacube, the collective datacube having similar dimensions as the plurality of sparse datacubes.

19. A computer program product having a computer readable storage medium operable to store computer program logic embodied in computer program code encoded thereon which, when executed by a computer processor responsive to the computer program code, causes the computer to report file characteristics in a storage area network comprising performing the operations of:
   traversing a plurality of file entities to identify file data concerning attributes of the file entities according to predetermined metadata;
   gathering multidimensional data sets corresponding to each of the identified file entities, each of the multidimensional data sets having a predetermined number of dimensions indicative of an attribute, the multidimensional data sets further comprising dimensions and buckets, dimensions corresponding to attributes and buckets corresponding to predetermined ranges of values;
subdividing the dimensions into buckets corresponding to each of the attributes, each of the buckets indicative of a subrange of values of the attribute; and
   aggregating the gathered multidimensional data sets to build an aggregated data cube indicative of collective metrics of each attribute for each of the traversed file entities, aggregating further including:
      scanning, for each of the dimensions, data values corresponding to the attributes of each of the scanned dimensions;
      identifying, for each of the scanned data values, a bucket corresponding to the data value; and
      storing, in a split word format, values corresponding to the dimension and the bucket, the split work format employing a portion of the split word for the dimension value and the remaining portion of the word for the bucket value.

20. A storage area network (SAN) management server for reporting file characteristics in a storage area network comprising:
   means for traversing a plurality of file entities to identify file data concerning attributes of the file entities according to predetermined metadata, the metadata indicative of file attributes, the means for traversing further operable to:
      identify each of the file entities contributing to a particular reported output cell value; and
      enumerate file entities corresponding to a particular bucket;
   means for gathering multidimensional data sets corresponding to each of the identified file entities, each of the multidimensional data sets further comprising a sparse datacube object having a predetermined number of dimensions indicative of an attribute;
   means for populating the sparse datacube with the multidimensional data sets;
   means for transmitting the populated sparse datacube objects to the server, each of the populated sparse datacube objects corresponding to the same multidimensional data cube dimensional structure;
   means for aggregating the gathered multidimensional data sets to build an aggregated data cube indicative of collective metrics of each attribute for each of the traversed file entities, the means for aggregating further including:
      means for scanning, for each of the dimensions, data values corresponding to the attributes of each of the scanned dimensions;
      means for identifying, for each of the scanned data values, a bucket corresponding to the data value; and
      means for storing, in a split word format, values corresponding to the dimension and the bucket, the split word format employing a portion of the split word for the dimension value and the remaining portion of the word for the bucket value, the bucket value corresponding to a pointer to a set of arrays, each array storing values of a particular dimension;
   means for gather a plurality of sparse datacubes, each of the sparse datacubes indicative of files traversed by a particular agent; and
   means for aggregating the plurality of sparse datacubes into a collective datacube, the collective datacube having similar dimensions as the plurality of sparse datacubes.

* * * * *